US009419265B2

(12) United States Patent
Hwang et al.

(10) Patent No.: US 9,419,265 B2
(45) Date of Patent: Aug. 16, 2016

(54) HIGH-STRENGTH ELECTROSPUN MICROFIBER NON-WOVEN WEB FOR A SEPARATOR OF A SECONDARY BATTERY, A SEPARATOR COMPRISING THE SAME AND A METHOD FOR MANUFACTURING THE SAME

(71) Applicants: LG CHEM, LTD., Seoul (KR); TORAY BATTERY SEPARATOR FILM CO., LTD., Nasushiobara-shi, Tochigi (JP)

(72) Inventors: Won-Pill Hwang, Daejeon (KR); Byeong-Gyu Cho, Daejeon (KR); Young-Deok Kim, Daejeon (KR)

(73) Assignees: LG CHEM, LTD., Seoul (KR); TORAY BATTERY SEPARATOR FILM CO., LTD., Nasushiobara-Shi (JP)

( * ) Notice: Subject to any disclaimer, the term of this patent is extended or adjusted under 35 U.S.C. 154(b) by 165 days.

(21) Appl. No.: 14/529,862

(22) Filed: Oct. 31, 2014

(65) Prior Publication Data
US 2015/0132632 A1    May 14, 2015

(30) Foreign Application Priority Data
Oct. 31, 2013    (KR) .................. 10-2013-0131228
Oct. 31, 2014    (KR) .................. 10-2014-0150745

(51) Int. Cl.
*H01M 2/16*  (2006.01)
*H01M 2/14*  (2006.01)
*D04H 1/728* (2012.01)
*H01M 10/052* (2010.01)

(52) U.S. Cl.
CPC ............... *H01M 2/162* (2013.01); *D04H 1/728* (2013.01); *H01M 2/145* (2013.01); *H01M 2/1666* (2013.01); *H01M 10/052* (2013.01); *Y02T 10/7011* (2013.01); *Y10T 442/609* (2015.04)

(58) Field of Classification Search
None
See application file for complete search history.

(56) References Cited

U.S. PATENT DOCUMENTS

| 2009/0092893 | A1 | 4/2009  | Takita et al. |
| 2010/0304205 | A1 | 12/2010 | Jo et al.     |
| 2012/0225358 | A1 | 9/2012  | Seo et al.    |

(Continued)

FOREIGN PATENT DOCUMENTS

| JP | 2002-246001 A     | 8/2002 |
| KR | 10-2008-0013209 A | 2/2008 |
| KR | 10-2011-0049715 A | 6/2011 |

(Continued)

*Primary Examiner* — Patrick Ryan
*Assistant Examiner* — Wyatt McConnell
(74) *Attorney, Agent, or Firm* — Birch, Stewart, Kolasch & Birch, LLP

(57) ABSTRACT

The present disclosure provides a method for manufacturing an electrospun microfiber non-woven web with high strength for a lithium secondary battery, a non-woven web manufactured therefrom, and a separator comprising the non-woven web. More specifically, the present disclosure provides a microfiber non-woven web manufactured by bringing a solution of engineering plastic resin with high heat-resistance into electrospinning, the manufacture thereof, and a separator comprising the web.

According to the present disclosure, the engineering plastic resin with high heat-resistance is used in the manufacture of the microfiber non-woven web to provide improved physical properties including tensile strength and good heat-resistance and chemical-resistance, as compared with conventional polyethylene-based separators.

15 Claims, 3 Drawing Sheets

(56) References Cited

U.S. PATENT DOCUMENTS

| | | | |
|---|---|---|---|
| 2012/0315225 A1* | 12/2012 | Porbeni | A61L 15/26 424/49 |
| 2013/0115519 A1 | 5/2013 | Lee et al. | |
| 2013/0164629 A1* | 6/2013 | Hou | D01F 6/74 429/249 |

FOREIGN PATENT DOCUMENTS

| | | |
|---|---|---|
| KR | 10-2011-0105365 A | 9/2011 |
| KR | 10-2011-0136745 A | 12/2011 |
| KR | 10-1135077 B1 | 4/2012 |
| KR | 10-2014-0067370 A | 6/2014 |
| KR | 10-1402976 B1 | 6/2014 |

* cited by examiner

HIGH-STRENGTH ELECTROSPUN MICROFIBER NON-WOVEN WEB FOR A SEPARATOR OF A SECONDARY BATTERY, A SEPARATOR COMPRISING THE SAME AND A METHOD FOR MANUFACTURING THE SAME

CROSS-REFERENCE TO RELATED APPLICATION

This application claims priority under 35 USC 119(a) to Korean Patent Application No. 10-2013-0131228 filed in the Republic of Korea on Oct. 31, 2013, and Korean Patent Application No. 10-2014-0150745 filed in the Republic of Korea on Oct. 31, 2014, which are incorporated herein by reference.

TECHNICAL FIELD

The present disclosure relates to a microfiber non-woven web for a separator of a secondary battery, more specifically a microfiber non-woven web obtained by electrospinning an engineering plastic resin solution with high heat-resistance, a separator comprising the same and a method for manufacturing the same.

BACKGROUND ART

Recently, there has been an increasing interest in energy storage technology. As the application fields of energy storage technologies have been extended to cellular phones, camcorders, notebook computers, PCs and electric cars, efforts have been increasingly been made towards the research and development of electrochemical devices capable of charging and discharging, particular a lithium secondary battery.

The secondary battery commonly uses a porous separator which is, however, subject to severe thermal shrinkage at a temperature of 100° C. or higher in view of their material characteristics and production processes including elongation. This thermal shrinkage behavior may cause a short circuit between a cathode and an anode. Also, when the battery undergoes a rapid rise in voltage upon overcharge owing of various causes, including the abnormal operation of a charger, excessive amounts of lithium is disintercalated in a cathode and intercalated in an anode, depending on state of charge, making both electrode of the cathode and the anode be thermally unstable. In this case, an organic solvent in an electrolyte solution is discomposed to cause rapid exothermic reaction resulting in thermal runaway, which may cause great damage in battery stability. Such an overcharge may cause a local internal short circuit and an intensive temperature rise occurs in the position of the local internal short circuit. In order to prevent the internal short circuit, the lithium secondary battery should have a separator with good heat-resistance, particularly a minimized shrinkage rate, at a high temperature. In addition to such properties, the separator should also be made of a thin film so as to achieve the miniaturization of a battery pack and minimize electrical resistance, and is required to have uniform and high porosity so as to improve charging/discharging efficiency and cycle characteristics.

Conventional separators are generally a single- or multi-layered thin film made of a polyolefin. However, these separators fail to have heat-resistance, particularly shrinkage rate at a high temperature enough to prevent an internal short circuit stably, and they are difficult to have uniform and high porosity due to a limit in their preparation method.

DISCLOSURE

Technical Problem

Accordingly, the present disclosure is designed to solve the above-mentioned problems, and therefore it is directed to providing a porous separator having excellent mechanical properties such as tensile strength, high heat-resistance, and good chemical resistance.

Other objects and advantages of the present disclosure will be understood by the following description, and it is understood that these can be achieved by means, methods or a combination thereof which are defined in the claims.

Technical Solution

In order to achieve the above object, the present disclosure provides a microfiber non-woven web to be used in a separator for a secondary battery, a method for manufacturing the non-woven web, and a separator comprising the non-woven web.

The microfiber non-woven web is composed of filaments with a diameter of 10 nm to 3 μm, and has a tensile strength of 30 to 120 Mpa and an area shrinkage rate less than 0.5% when it is maintained for 30 minutes at the ambient temperature of 250° C.

In the present disclosure, the non-woven web may comprise an engineering plastic resin with high heat-resistance.

The engineering plastic resin with high heat-resistance may be any one selected from the group of consisting of polysulfone (PSF) resins, polyethersulfone (PES) resins, polyetherimide (PEI) resins, polyphenylenesulfide (PPS) resins, polyether ether ketone (PEEK) reins, polyacrylate (PA) resins, polyamideimide (PAI) resins, polyimide (PI) resins, polyamide resins, and a mixture thereof.

Among these, polyamideimide resins, polyimide resins, polyamide resins, and a mixture thereof may be preferably used as the engineering plastic resin with high heat-resistance.

The polyamideimide resins, polyimide resins, polyamide resins, and a mixture thereof may have a molecular weight of 100,000 to 10,000,000 Da.

Also, the present disclosure provides a separator for a secondary battery, comprising the above-mentioned microfiber non-woven web.

In the present disclosure, the separator may comprise a microfiber non-woven web and a porous polyolefin separator substrate.

The separator may be obtained by disposing the porous polyolefin separator substrate on at least one surface of the microfiber non-woven web.

Also, the separator may have a porous coating layer of an organic/inorganic composite being formed on at least one surface thereof, and the porous coating layer comprising a mixture of inorganic particles and a binder resin.

Further, the present disclosure provides a method for manufacturing the above-mentioned microfiber non-woven web, comprising (S1) preparing an electrospinning solution containing an engineering plastic resin with high heat-resistance; (S2) applying high voltage to the electrospinning solution to induce electrospinning, thereby forming aggregates; (S3) bringing the aggregates into rolling to obtain a non-woven web being uncured; and (S4) bringing the non-woven web obtained in step (S3) into curing.

In the present disclosure, the electrospinning solution may be produced by bringing the resin into heat-melting or produced by mixing the resin with a solvent.

The rolling may be conducted by way of hot rolling.

The curing may be conducted at a temperature of 250 to 350° C.

The curing may be conducted under the condition of pressurization.

The rolling may be conducted in the state that the solvent of the electrospinning solution is remained.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Figure 1:
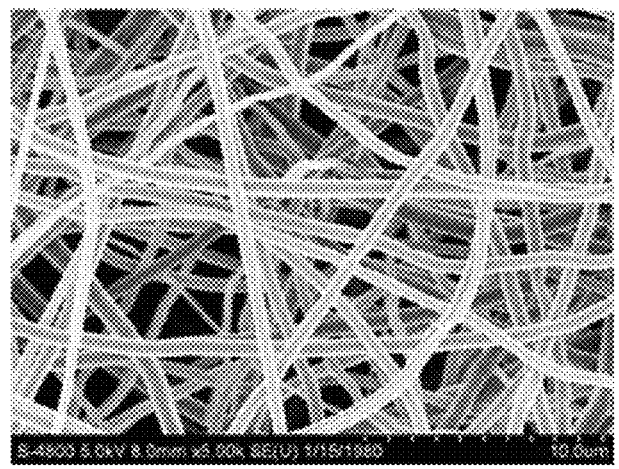
FIG. 1 is an SEM photograph showing the state of the electrospun non-woven web prepared in Example 1 before its rolling and curing.
Figure 2:
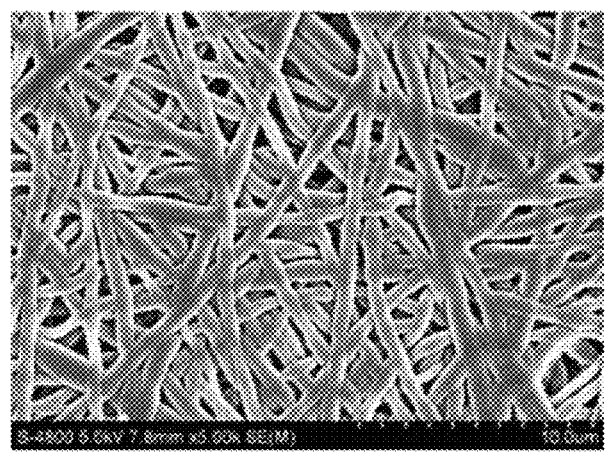
FIGS. 2 and 3 are SEM photographs showing the state of the electrospun non-woven web prepared in Example 1 after its rolling.
Figure 3:
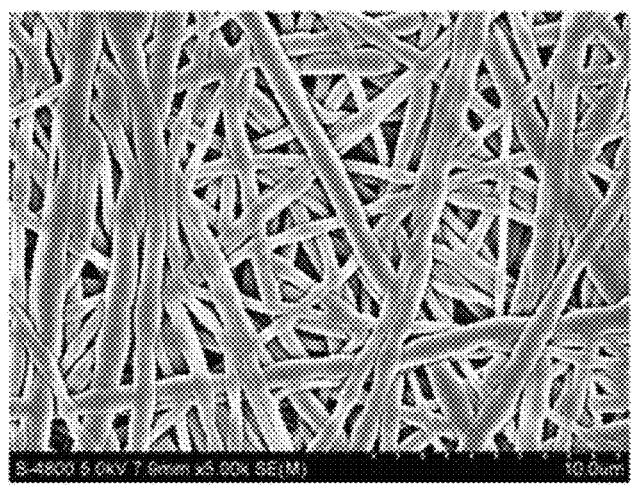
Figure 4:
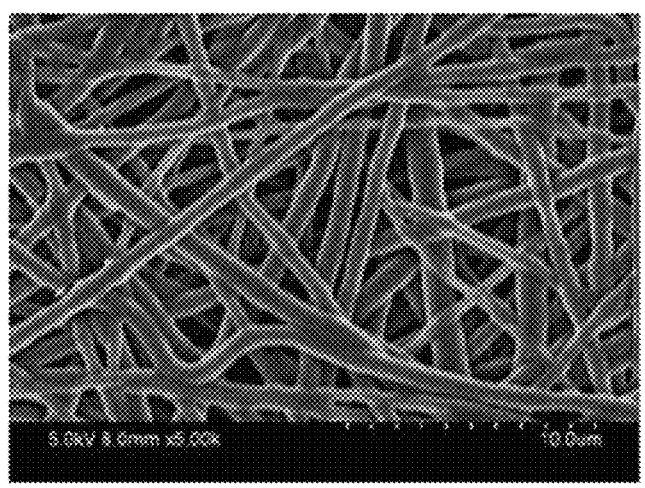
FIG. 4 is an SEM photograph showing the state of the electrospun non-woven web prepared in Example 1 after its rolling and curing.

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

The present disclosure relates to a microfiber non-woven web comprising an engineering plastic resin with high heat-resistance, and a method for manufacturing the same. Also, the present disclosure relates to a separator for a secondary battery, comprising the microfiber non-woven web. In the present disclosure, the microfiber non-woven web is manufactured by bringing the engineering plastic resin with high heat-resistance into electrospinning to form aggregates, and rolling and curing the aggregates.

The microfiber non-woven web has a tensile strength of 30 to 120 Mpa, preferably 50 to 100 Mpa. The tensile strength may be measured according to various methods being conventionally used in the art, for example, standard methods of ASTM D638, D882, ISO 527, BS2782, KS M3006. Also, the microfiber non-woven web has very excellent heat-shrinkage property, i.e., an area shrinkage rate less than 0.5%, preferably less than 0.1%, most preferably 0%, when it is maintained for 30 minutes at the ambient temperature of 200° C. and 250° C. As will be described, the microfiber non-woven web of the present disclosure is manufactured through a curing process at a high temperature of 250° C. or higher, or 300° C. or higher, or 250 to 350° C., so it is little subject to heat-shrinkage. Therefore, a separator using such a microfiber non-woven web does not cause an electrical short circuit by melting or contraction even under the high-temperature condition that the ambient temperature is 300° C. or higher. The shrinkage rate may be measured according to methods being conventionally used in the art, for example, by placing a specimen of the non-woven web in an oven set to a predetermined temperature for a certain time, measuring a changed dimension of the specimen, and comparing the measurement with the dimension value before heat-shrinkage to calculate a shrinkage ratio.

The microfiber non-woven web of the present disclosure has a plurality of pores. The pores have an average size (the longest diameter) of 20 to 1,000 nm, or 20 to 500 nm, 2 or 0 to 300 nm, or 20 to 150 nm, or 20 to 100 nm. In a specific embodiment of the present disclosure, pores having a diameter of 20 to 1,000 nm, or 20 to 500 nm, 2 or 0 to 300 nm, or 20 to 150 nm, or 20 to 100 nm in the microfiber non-woven web may be present in an amount of 50 vol % or more, or 75 vol % or more, or 90 vol % or more, based on the total 100 vol % of pores. The pores may be measured according to methods being conventionally used in the art, for example by using a capillary flow porometer.

Also, the microfiber non-woven web of the present disclosure has an air permeability of 1 to 800 sec/100 cc, or 1 to 500 sec/100 cc, or 1 to 300 sec/100 cc, or 1 to 200 sec/100 cc, or 70 to 150 sec/100 cc, or 90 to 150 sec/100 cc. The air permeability may be measured according to methods being conventionally used in the art, for example the Gurley method (JIS P8117). Such micropores and good air permeability can be achieved by controlling the size of pores in the manufacturing of the microfiber non-woven web, specifically through rolling of the non-woven web formed by electrospinning.

According to a specific embodiment of the present disclosure, the microfiber non-woven web has a porosity of 20 to 80%, or 30 to 60%. The porosity may be measured according to methods being conventionally used in the art, for example ASTM standard measurements. The microfiber non-woven web of the present disclosure may have a thickness of 10 to 70 μm, or 10 to 50 μm, or 10 to 30 μm, or 5 to 15 μm. Also, the non-woven web is composed of filaments having a diameter of 10 nm to 3 μm, or 10 nm to 1 μm, or 10 to 700 nm, or 100 to 500 nm. In addition, the filaments have a density of 1.0 to 4.0 g/cm$^3$, or 1.5 to 2.5 g/cm$^3$.

Also, the present invention provides a separator comprising the microfiber non-woven web. Since the separator of the present disclosure has the microfiber non-woven web having the above-mentioned properties, the separator has a high air permeability, as compared with conventional separator, thereby providing very excellent charging/discharging efficiency and cycle characteristics to an electrochemical device such as a lithium battery. Also, since the microfiber non-woven web of the present disclosure comprises an engineering plastic resin with high heat-resistance and is cured at a high temperature to have a minimized area shrinkage rate under the high-temperature condition, the separator comprising the non-woven web can be used in an electrochemical device such as a lithium battery, with little short circuit between electrodes even under the high-temperature condition.

As mentioned above, the microfiber non-woven web of the present disclosure comprises an engineering plastic resin with high heat-resistance. The engineering plastic resin has a heat-resistant temperature of 150° C. or higher, preferably 200° C. or higher. Conventional separators are largely made of a polyolefin resin of polyethylene or polypropylene. However, this polyolefin resin has a relative low melting point of about 110 to 140° C., making it difficult to effectively prevent the shrinkage of the separator when a battery is overheated. In order to solve such a problem, the present inventors have applied the engineering plastic resin having a heat-resistant temperature of 150° C. or higher in the microfiber non-woven web for the purpose of obtaining stability even on the overheating of an electrochemical device.

The engineering plastic resin with high heat-resistance has a molecular weight of 10,000 or more, preferably 100,000 to 10,000,000, most preferably 500,000 or more. Specific examples of the engineering plastic resin with high heat-resistance may include polysulfone (PSF) resins, polyethersulfone (PES) resins, polyetherimide (PEI) resins, polyphenylenesulfide (PPS) resins, polyether ether ketone (PEEK) reins, polyacrylate (PA) resins, polyamideimide (PAI) resins, polyimide (PI) resins, polyamide resins, and a mixture thereof. Examples of the polyimide resins may include aramid resins, Nomex, Kkeblar, and the like. The engineering plastic resin is not limited to the above-mentioned kinds, other plastic resins having the above-mentioned properties may be used. In a specific embodiment of the present disclosure, the microfiber non-woven web may comprise one of these plastic resins or a mixture of two or more thereof.

According to a preferred embodiment of the present disclosure, the engineering plastic resin with high heat-resistance may be polyamideimide resins, polyimide resins, and/or polyamide resins. The polyamideimide resins and the polyimide resins are preferably a polymer that contains imide monomer units or a copolymer of imide monomer units and other monomer units. That is, the polyamideimide resins and the polyimide resins contain a linear or aromatic imide group in the main chain.

In the present disclosure, the microfiber non-woven web may be used alone as the substrate of a separator for a secondary battery. Also, according to a specific embodiment of the present disclosure, the microfiber non-woven web may be laminated with various separator substrates having other properties to provide a separator for an electrochemical device in various forms.

In a specific embodiment of the present disclosure, the separator of the present disclosure may further comprise a porous polyolefin separator substrate, in addition to the microfiber non-woven web. The porous polyolefin separator substrate has a shutdown property at a temperature of 130 to 150° C. which can more enhance the safety of a secondary battery when being used together with such a separator substrate. The porous polyolefin separator substrate may be prepared by melting and extruding a polyolefin resin to produce a film, and drawing the film to form micropores. The separator may be prepared by way of a wet or dry method, but is not limited thereto. The polyolefin resins may comprise a polymer selected from the group consisting of low-density polyethylene (LDPE), linear low-density polyethylene (LLDPE), high-density polyethylene (HDPE), ultra-high molecular weight polyethylene (UHMWPE), polypropylene, polybutene, polymethylpentene, a copolymer thereof, and a mixture thereof.

According to a specific embodiment of the present disclosure, the separator may be a multi-layered structure in which one or more the microfiber non-woven webs and one or more the porous polyolefin separator substrates are alternatively, regardless of order, laminated in two or three layers. For example, the separator of the present disclosure is a composite separator in which the microfiber non-woven webs are formed on both surfaces of the porous polyolefin separator substrate. In such a form of the composite separator, the non-woven webs can maintain their inherent shape even at a temperature exceeding the shutdown temperature of the porous polyolefin separator substrate, thereby preventing a short circuit in a battery and thermal runaway caused therefrom.

Also, according to a specific embodiment of the present disclosure, the separator may further comprise a porous coating layer of an organic/inorganic composite being formed on at least one surface thereof, and the porous coating layer comprising a mixture of inorganic particles and a binder resin. In the porous coating layer, the inorganic particles are immobilized with each other through dot bonding and/or surface bonding between the particles by the binder polymer resin, thereby maintaining their physical forms. Also, the porous coating layer has a plurality micropores formed by interstitial volumes of the inorganic particles. The porous coating layer has a thickness of 1 to 30 μm, or 1 to 20 μm, or 1 to 15 μm. The inorganic particles are not limited to their size, but preferably have a size of 0.001 to 10 μm so as to form a film having uniform thickness and suitable porosity. Also, in a specific embodiment of the present disclosure, the inorganic particles are present in an amount of 50 to 99 wt %, or 60 to 95 wt %, based on 100 wt % of the porous coating layer.

Figure 6:
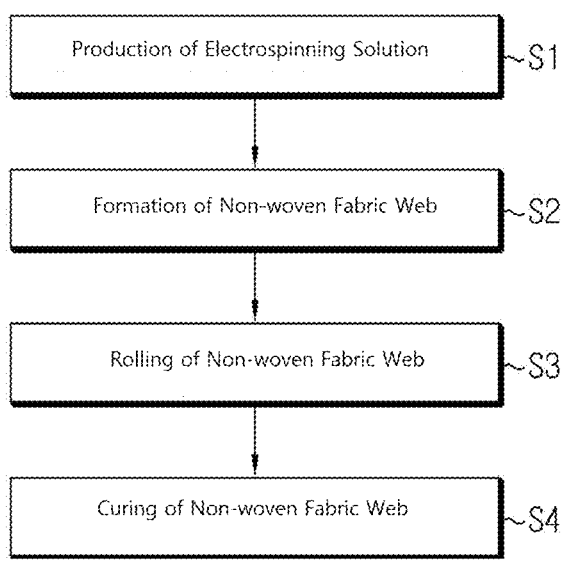
FIG. 6 is a flow chart showing the procedures for manufacturing the microfiber non-woven web for a separator according to the present disclosure.

FIG. 6 is a flow chart briefly showing the procedures for manufacturing the microfiber non-woven web according to the present disclosure. Hereinafter, the method of manufacturing the microfiber non-woven web of the present disclosure will be described according to the sequences shown in FIG. 6.

Firstly, an engineering plastic resin with high heat-resistance is used to produce an electrospinning solution. The electrospinning solution may be produced by heat-melting the engineering plastic resin as a raw material for electrospinning, or dispersing or dissolving it in an organic solvent. The organic solvent may be at least one selected from chlorinated organic solvents such as chloroform, methylene chloride, carbon tetrachloride, carbon dichloride, ethane trichloride, vinyl chloride, ethylene dichloride, ethylene trichloride and ethylene teterachloride, aliphatic organic solvents such as dimethylacetamide (DMAC), dichloromethane, 1,2-dichloroethane, benzene, toluene, carbon tetrachloride, xylene, tetrahydrofuran, hexane, heptane, octane, aromatic organic solvents, ethers, ketones, esters, and a mixture thereof, but is not limited thereto.

The electrospinning solution may contain the resin in an amount of 10 to 30 wt % based on 100 wt % of the electrospinning solution, but the amount of the resin is not particularly limited thereto. The amount of the resin may be determined considering various process conditions, including polymer resin properties (molecular weight, molecular structure, glass transition temperature, solubility, etc.), solvent properties (viscosity, elasticity, concentration, surface tension, conductivity, etc.), and electrospinning conditions.

Then, the electrospinning solution is subject to electrospinning to prepare a non-woven web. Specifically, a member for supplying the electrospinning solution is connected to a nozzle for electrospinning, and a high electric field (~100 kV) is formed by using a high-voltage generator between the nozzle and a collector, thereby conducing electrospinning. In the nozzle to which a high voltage is applied, filaments are electrospun and collected in the collector being positioned at a predetermined distance, thereby forming a non-woven web. The size of the electric field has the relation with a distance between the nozzle and the collector, and combinations of such a relation may be used to facilitate the electrospinning. The electrospinning may be conducted by using an electrospinning device being generally used, without a specific limitation, for example by way of electro-blowing or centrifugal electrospinning. According to a specific embodiment of the present disclosure, the electrospinning may be conducted under the conditions of a spinning voltage of 10 to 100 kV, a spinning distance of 10 to 100 cm, a spinning rate of 0.5 to 10 ml/hr, but the present disclosure is not limited thereto. The electrospinning conditions may be properly controlled. Thereby, non-woven aggregates which consist of filaments having a diameter less than about 1 μm can be obtained. FIG. 1 is an SEM photograph of aggregates obtained through electrospinning, in which filament fibers are separated from each other without bonding and pores between the fibers are larger than those of the non-woven web after a rolling process.

Next, the aggregates obtained above are rolled. The rolling improves the bonding between the fibers, thereby increasing the durability of the non-woven web and controlling the density, porosity and thickness of the microfiber non-woven web within the above-mentioned range. According to one embodiment of the present disclosure, the aggregates obtained in the electrospinning step are laminated in a single layer or two or more layers, and the thickness thereof is controlled through rolling.

The rolling is conducted to provide the desired properties to the separator, and its method is not particularly limited. The rolling may be conducted at room temperature or may be made by way of hot-rolling or cool-rolling. For example, one or more times of hot-rolling or one or more times of cool-rolling may be conducted. Alternatively, a proper combination of hot-rolling and cool-rolling may achieve the optimized rolling process, for example the hot-rolling and the cool-rolling may be used in a combination of two or more times. According to a specific embodiment of the present disclosure, at least one of hot-rolling process is preferably conducted. By the hot-rolling, the solvent present in the non-woven web may be partially removed. According to a specific embodiment of the present disclosure, the rolling may be conducted by using a roller. The rolling temperature, the rolling pressure, the contact time of the non-woven web and the roller, and the rolling rate of the roller may be varied depending on the states of the object for rolling, i.e., the non-woven web obtained in the prior step, and may be properly controlled to provide suitable properties desired to the use purposes.

After rolling, the non-woven web is cured. In the curing step, the solvent being not removed in the rolling step is further removed while the non-woven web is dried. The method of the present disclosure needs no separate step of drying the non-woven web since the solvent is removed in the prior rolling step and this curing step. Accordingly, the method of the present disclosure is favorable in terms of process. Also, the resin is cured as the electrospun non-woven web is dried, thereby reinforcing the physical properties of the non-woven web, such as improvement in tensile strength. The curing is conducted under the heating conditions, for example, a temperature of 250° C. or higher, or 300° C. or higher, or 350° C. or higher, or 250 to 350° C. According to a specific embodiment of the present disclosure, the curing is conducted under the heating conditions that the temperature is raised at an increase rate of 5° C. into 300° C. at which temperature is maintained for 1 hour or more, preferably 3 hours or more. It is preferred that the heating is conducted at a constant pressure.

As mentioned above, since the microfiber non-woven web of the present disclosure is manufactured from rolling and curing, filaments fibers are closely connected to each other, allowing the morphology of the non-woven web to match that of a film. According to evaluation of properties which will be described, the microfiber non-woven web of the present disclosure has pores with a size of about 0.035 μm being similar to the pore size of porous polyolefin films which have been conventionally used in the preparation of an electrochemical device.

Figure 5:
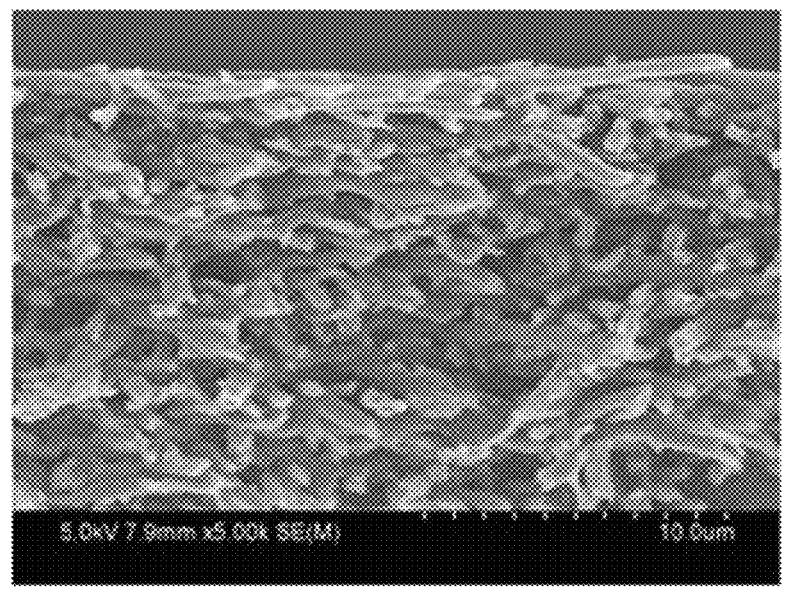
FIG. 5 is an SEM photograph showing a cross-section of the web of FIG. 4.

Also, FIGS. 5 and 6 are SEM photographs of the microfiber non-woven web according to the Example of the present disclosure, from which it is confirmed that the non-woven web is composed of filament fibers having a micro-sized diameter of a nanometer scale and the fibers in the separator are pretty closely distributed.

Hereinafter, various preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

Example 1

Manufacture of Microfiber Non-Woven Web

Polyamideimide (PAI) (TI-5000, Toray Industries, Inc.) was dissolved in dimethylacetamide (DMAC) to obtain a 25% polyamideimide solution for electrospinning. Specifically, after dissolving the polyamideimide in DMAC, in order for solids to be uniformly dispersed in the solvent, the solution was agitated using an agitator with a propeller at room temperature for 8 hours. The agitation was made to provide a suitable viscosity condition to the solution so as to avoid the situation that the solution with too high viscosity cannot be spun, or the solution with too low viscosity may be flowed down. The electrospinning solution thus obtained was put in a supplying member and connected to a spinning nozzle. After applying a voltage of 60 kV to the nozzle and maintain the distance between the nozzle and a collector into 60 cm, electrospinning was conducted at a discharging rate of 0.05 to 1 cc/g per hole, thereby producing PAN non-woven web at a belt speed of 10 Hz. The non-woven web was composed of filaments with a diameter of 500 nm, and the thickness of the non-woven web was 100 μm. The non-woven web produced above was put between two rollers heated into 120° C., followed by rolling until the thickness was 20 μm. After rolling, the non-woven web was fixed between glass plates and placed in an oven, and then curing was conducted by raising the temperature at an increase rate of 5° C. into 300° C. and maintaining the raised temperature for 3 hours. Thereby, a microfiber non-woven web was manufactured.

Comparative Example

Polyamideimide (PAI) was dissolved in dimethylacetamide (DMAC) to obtain a 17% polyamideimide solution for electrospinning. The obtained electrospinning solution was put in a supplying member and connected to a spinning nozzle. After applying a voltage of 60 kV to the nozzle and maintain the distance between the nozzle and a collector into 60 cm, electrospinning was conducted at a discharging rate of 0.05 to 1 cc/g per hole, thereby producing PAN non-woven web at a belt speed of 10 Hz. The non-woven web was composed of filaments with a diameter of 500 nm, and the thickness of the non-woven web was 100 μm. The non-woven web produced above was put between two rollers heated into 120° C., followed by rolling until the thickness was 20 μm. After rolling, the remained solvent was removed to obtain a non-woven web.

Test Example

Evaluation of Microfiber Non-Woven Web for their Properties

1. Methods (1) Pore Size

The non-woven webs obtained in the Example and the Comparative Example were measured for their pore size, i.e., mean flow pore size (MFPS) and a maximum pore size by using an automated capillary flow porometer (Model CFP-1200AEL (CFP-34RTF8A-X-6-L4), Porous Materials, Inc. (PMI)). For measurement, galwick acid with a surface tension of 15.9 dynes/cm was used as a wetting fluid, and an adopter with a diameter of 21 mm was used, and also a wet-up/dry-up measuring method was adopted.

(2) Porosity

The non-woven webs obtained in the Example and the Comparative Example were measured for their porosity. The porosity was determined by measuring the diameter of micropores filled with Hg at a constant pressure according to ASTM D4284-92. Specifically, the diameter of micropores and the volume of Hg filled in the webs were measured at each pressure while a pressure of 0.5 to 60,000 psi was continuously applied. The measurement was automatically made and the results calculated therefrom were output. For measurement, Autopore IV 9500 (Micrometrics) was used, and pores of 0.003 to 360 μm can be measured.

(3) Air Permeability

The non-woven webs obtained in the Example and the Comparative Example were measured for their air permeability according to JIS P8117 by using a B-type Gurley densometer (Toyo Seiki). Specifically, a sample separator for an electrochemical device was clamped onto a circular hole with a 28.6 mm diameter and a 645 mm² area, and an internal cylinder with a weight of 567 g was used to pass the air in the cylinder from the test circular hole section out of the cylinder. The time for permeation of 100 cc of air was measured as the air permeability.

(4) Heat-Shrinkage Rate

The non-woven webs obtained in the Example and the Comparative Example were measured for their heat-shrinkage rate. Specifically, a sample (5 cm×2 cm) of each non-woven web was put between glass slides, followed by clipping at both ends of the slides, and then the slides were placed in an oven set to the predetermined temperature. After 30 minutes, each sample was taken out from the oven and cooled into room temperature, followed by measuring for an area shrinkage rate.

(5) Tensile Strength

The non-woven webs obtained in the Example and the Comparative Example were measured for their tensile strength. Specifically, a sample (5 cm×5 cm) of each non-woven web was provided and the tensile strength thereof was measured according to ASTM 0638.

2. Results

TABLE 1

|  | Example | Comparative Example |
| --- | --- | --- |
| Mean flow pore size (μm) | 0.035 | 6 |
| Porosity (%) | 49 | 55 |
| Air permeability (s/100 cc) | 100 | 10 |
| Tensile strength (MPa) | 62.9 | 13 |

TABLE 1-continued

|  |  | Example |  |  |  | Comparative Example |  |  |  |
| --- | --- | --- | --- | --- | --- | --- | --- | --- | --- |
| Heat resistance | Temperature (° C.) | 150 | 180 | 200 | 230 | 150 | 180 | 200 | 230 |
|  | Area Shrinkage Rate (%) | 0 | 0 | 0 | 0 | 5 | Melted |  |  |

Table 1 shows the results of the above test 1 to 4. The web of the Example exhibited a tensile strength of 62.9 MPa, a pore size of 0.035 μm, a porosity of 49%, and an air permeability of 100 s/100 cc which are suitable as a separator for a secondary battery. In contrast, the web of the Comparative Example exhibited a pore size of 6 μm being excessively large as compared with that of the Example, a very low air permeability of 10 s/100 cc, and poor physical properties such as a tensile strength of 13 MPa. In the case that porosity is high and the time of air permeation is short as in the Comparative Example, a short or micro-short may be caused in the preparation or the use of a cell, so it cannot be suitably used as a separator.

In terms of the area shrinkage rate, the separator of the Example was not subject to shrinkage under the condition of 150° C. or higher, whereas that of the Comparative Example exhibited a shrinkage rate of 5% at 150° C. and was melted at 180° C. or higher. From these results, it was confirmed that the separator using an engineering plastic resin with high heat-resistance according to the present disclosure has good heat-resistance and excellent air permeability, thereby being effectively used as a separator for a secondary battery.

What is claimed is:

1. A microfiber non-woven web for a secondary battery separator, whose filaments has a diameter of 10 nm to 3 μm, tensile strength ranges from 30 to 120 Mpa, and area shrinkage rate is less than 0.5% when the web is maintained for 30 minutes at the ambient temperature of 250° C.

2. The microfiber non-woven web of claim 1, which comprises an engineering plastic resin with high heat-resistance.

3. The microfiber non-woven web of claim 2, wherein the engineering plastic resin with high heat-resistance is any one selected from the group of consisting of polysulfone (PSF) resins, polyethersulfone (PES) resins, polyetherimide (PEI) resins, polyphenylenesulfide (PPS) resins, polyether ether ketone (PEEK) reins, polyacrylate (PA) resins, polyamideimide (PAI) resins, polyimide (PI) resins, polyamide resins, and a mixture thereof.

4. The microfiber non-woven web of claim 3, wherein the engineering plastic resin with high heat-resistance is any one selected from the group of consisting of polyamideimide resins, polyimide resins, polyamide resins, and a mixture thereof.

5. The microfiber non-woven web of claim 2, wherein the engineering plastic resin with high heat-resistance has a molecular weight of 100,000 to 10,000,000 Da.

6. A separator for a secondary battery, comprising the microfiber non-woven web of claim 1.

7. The separator of claim 6, which comprises the microfiber non-woven web and a porous polyolefin separator substrate.

8. The separator of claim 7, wherein the porous polyolefin separator substrate is disposed on at least one surface of the microfiber non-woven web.

9. The separator of claim 6, which has a porous coating layer of an organic/inorganic composite being formed on at least one surface thereof, and the porous coating layer comprising a mixture of inorganic particles and a binder resin.

10. A method for manufacturing the microfiber non-woven web of claim 1, comprising:
- (S1) producing an electrospinning solution containing an engineering plastic resin with high heat-resistance;
- (S2) applying high voltage to the electrospinning solution to induce electrospinning, thereby forming aggregates;
- (S3) bringing the aggregates into rolling to obtain a non-woven web being uncured; and
- (S4) bringing the non-woven web obtained in step (S3) into curing.

11. The method of claim 10, wherein the electrospinning solution is produced by bringing the resin into heat-melting or mixing with a solvent.

12. The method of claim 10, wherein the rolling is conducted by way of hot rolling.

13. The method of claim 10, wherein the curing is conducted at a temperature of 250 to 350° C.

14. The method of claim 13, wherein the curing is conducted under the condition of pressurization.

15. The method of claim 10, wherein the rolling is conducted in the state that the solvent of the electrospinning solution is remained.

* * * * *